United States Patent [19]

Shibata et al.

[11] Patent Number: 5,518,773
[45] Date of Patent: May 21, 1996

[54] EXTRUSION COATING METHOD

[75] Inventors: Norio Shibata; Akihiro Suzuki; Shinsuke Takahashi; Mikio Tomaru, all of Kanagawa, Japan

[73] Assignee: Fuji Photo Film Co., Ltd., Kanagawa, Japan

[21] Appl. No.: 348,070

[22] Filed: Nov. 23, 1994

Related U.S. Application Data

[63] Continuation of Ser. No. 35,307, Mar. 22, 1993, abandoned.

[30] Foreign Application Priority Data

Apr. 16, 1992 [JP] Japan .................................. 4-122612

[51] Int. Cl.[6] ...................................... B05D 1/26
[52] U.S. Cl. ........................... 427/356; 118/410; 427/128
[58] Field of Search .................................. 427/356, 128; 118/410, 411, 419; 425/461

[56] References Cited

U.S. PATENT DOCUMENTS

| | | | |
|---|---|---|---|
| 4,480,583 | 11/1984 | Tanaka et al. | 118/410 |
| 4,907,530 | 3/1990 | Shibata et al. | 118/419 |
| 5,105,760 | 4/1992 | Takahashi et al. | 118/411 |
| 5,202,164 | 4/1993 | Takahashi et al. | 427/356 |

FOREIGN PATENT DOCUMENTS

| | | |
|---|---|---|
| 0437210 | 7/1991 | European Pat. Off. . |
| 0452859 | 10/1991 | European Pat. Off. . |
| 2043013 | 2/1971 | France . |
| 2521995 | 11/1976 | Germany . |
| 3723149 | 1/1988 | Germany . |
| 4112428 | 10/1991 | Germany . |
| 58-205561 | 11/1983 | Japan . |
| 61-139929 | 6/1986 | Japan . |
| 63-20069 | 1/1988 | Japan . |

*Primary Examiner*—Shrive Beck
*Assistant Examiner*—Katherine A. Bareford
*Attorney, Agent, or Firm*—Sughrue, Mion, Zinn, Macpeak & Seas

[57] ABSTRACT

A coating apparatus for forming one or more coating layers on a substrate by means of an extrusion-type head comprising a front edge located on an upstream side with respect to a moving direction of the substrate and a back edge which is located on a downstream side in the moving direction of the substrate. The back edge has a corner portion partially defining an extrusion slot and which is displaced further from the substrate than the front edge in a state in which a precoating solution comprised mainly of an organic solvent is applied in advance on a coating surface of the substrate. A chamfered surface is formed on the corner portion. According to the invention, an angle $\alpha$ formed by the chamfered surface and a downstream inclined surface of the back edge is such that $40° \leq \alpha \leq 140°$, an angle $\beta$ formed by chamfered surface and an upstream inclined surface of the back edge is such that $40° \leq \beta < 180°$, and a width L (mm) of the chamfered surface is such that $0.002 \leq L$. Further, an angle $\theta$ formed by the downstream inclined surface of the back edge and the substrate which extends gradually away from the head is set to not less than 25°.

12 Claims, 2 Drawing Sheets

EXTRUSION COATING METHOD

This is a Continuation of application Ser. No. 08/035,307 filed Mar. 22, 1993, now abandoned.

BACKGROUND OF THE INVENTION

1. Field of the Invention

The present invention relates to an extrusion-type coating apparatus in which a coating solution continuously extruded toward a surface of a moving substrate is applied to the substrate surface at high speed to provide a thin-layered coat of a uniform thickness.

2. Background

Various extrusion-type coating apparatuses have been proposed in which a coating solution is applied to a surface of a moving substrate at high speed to provide a thin-layered coat of a uniform thickness. Also, various methods have been proposed for preventing the entrapment of air in the coating layer. Included in these methods are a method of sealing an upstream edge of a coating head by means of a precoating layer, a method of precoating utilizing a solution having an identical composition as the coating solution as disclosed in Japanese Patent Application Laid-Open No. 205561/1983 and a method of applying a solvent serving as a precoat to a substrate as disclosed in Japanese Patent Application Laid-Open No. 139929/1986. It is possible to realize thin-layered coatings at high speed utilizing these coating methods. However, the problems with each of these methods are as follows. In particular, in the extrusion-type coating apparatus used in each of the above methods, a space between a downstream edge of the coating head and the substrate is set in a pressurized state and a coating layer is subjected to smoothing. As a result of this smoothing process, the thickness of the coating layer is often not uniform if the thickness of the substrate is not uniform. Furthermore, if a foreign substance is disposed on the substrate, in the precoating solution or in the coating solution of the coating layer, the foreign substance is liable to become trapped at the downstream edge of the coating head resulting in the formation of streaks in the final coating.

It should be noted that typical coating solutions referred to herein include, for instance, photographic light-sensitive coating solutions, magnetic coating solutions, surface-protecting/antistatic or lubricating coating solutions, and the like. Typical resulting products include various photographic films, printing papers, magnetic recording media such as magnetic disks and magnetic tapes, and the like.

The present applicant has filed a copending application directed to a coating apparatus disclosed in Japanese Patent Application Laid-Open No. 20069/1988. This coating apparatus is capable of overcoming the above problems concerning coating streaks and nonuniform coating thickness attributable to nonuniform substrate thickness and the Young's modulus. Additionally, this apparatus is capable of reducing the pressure loss during the passage of the coating solution through the slot of the coating head.

In more detail, referring to FIG. 5, Japanese Patent Application Laid-Open No. 20069/1988 discloses a coating apparatus in which a coating surface of a substrate is liquid-sealed by an organic solvent applied in advance thereto. Thereafter, a coating layer is formed on the substrate by means of a front edge of the coating head, located on the upstream side in the moving direction of the substrate, and a sharp back edge, located on the downstream side. As described below, the back edge is displaced further from the substrate than the front edge.

According to this apparatus, as illustrated in FIG. 5 an organic solvent 6 is first applied to the coating surface of the substrate by means of a conventional coating apparatus such as a gravure coater, a roll coater, a blade coater, and an extrusion coater. This solvent layer 6 prevents the entrained air disposed on the upstream side of the front edge of the coating head from entering into the coating layer 7, thereby permitting high-speed coating in which a defect-free coating state is maintained.

As noted above, the back edge 3 is disposed such that a corner portion thereof is located further from the substrate than a tangent to the rear portion of the front edge 2 defining the outlet portion of a slit 8, as illustrated in FIG. 5. As a result, since a pressurizing force due to a substrate 1 does not act on the back edge 3, it is possible to prevent foreign substances from being trapped at the corner portion of the back edge 3 so as to thereby prevent the substrate from being scraped by the back edge 3. Furthermore, even if the substrate surface is not flat due to wariness (i.e., depressions in the substrate), the thickness of the coating remains substantially uniform in spite of the nonuniform thickness of the substrate. As a result, an excellent coated product can be obtained.

With this coating apparatus, however, there has been a problem caused by disturbances, such as the fluttering motion of the substrate or pressure fluctuations of the solution being fed which occur in a substrate-transporting system or a solution-feeding system during the coating process. As a result of theses disturbances, the coating solution adheres to the inclined surface of the back edge on the downstream side thereof resulting in a smear which is slightly hardened near the corner portion. This smear damages the coating surface, resulting in coating defects such as streaks.

In addition, similar coating defects such as streaks occur due, not only to the smearing of the back edge, but also to the breaking off of the corner portion of the back edge.

An object of the present invention lies in providing a coating apparatus capable of overcoming the above-described conventional problems and of stably forming uniform thin-layered coating films free of streaks and the like at high speed.

SUMMARY OF THE INVENTION

Such an object of the present invention is achieved by a coating apparatus for forming one or more coating layers on a substrate by means of an extrusion-type head comprising a front edge located on an upstream side with respect to a moving direction of the substrate and a back edge which is located on a downstream side in the moving direction of the substrate and whose corner portion is displaced further from the substrate than the front edge, in a state in which a precoating solution comprised mainly of an organic solvent is applied in advance on a coating surface of the substrate, wherein a chamfered surface is formed at the corner portion of the back edge, an angle α formed by the chamfered surface and a downstream inclined surface of the back edge is defined by:

$$40° \leq \alpha \leq 140°,$$

an angle β formed by chamfered surface and an upstream inclined surface of the back edge is defined by:

$40° \leq \beta < 180°$, and a width L (mm) of the chamfered surface is defined by:

$0.002 \leq L$, and wherein an angle θ formed by the downstream inclined surface of the back edge and the substrate which extends gradually away from the head is set to not less than 25°.

DETAILED DESCRIPTION OF PREFERRED EMBODIMENTS

Hereafter, a description will be given of an embodiment of the present invention with reference to the accompanying drawings.

Figure 1:
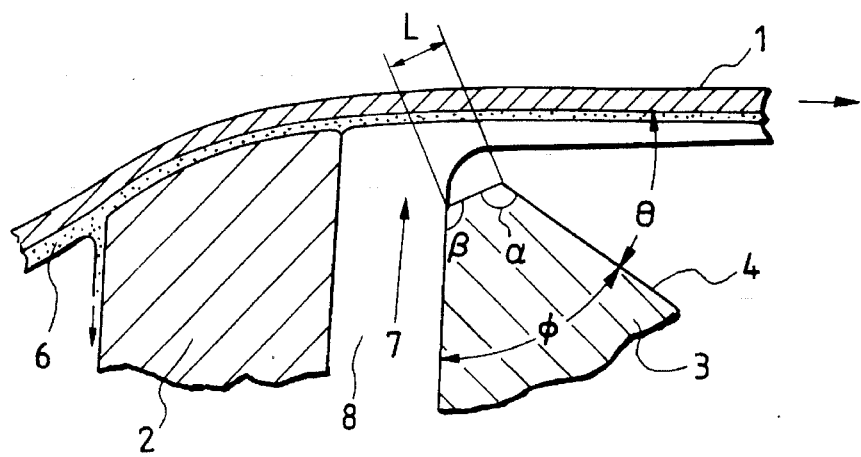
FIG. 1 is a fragmentary enlarged side cross-sectional view of a coating head and illustrates an angle θ formed by a downstream inclined surface of a back edge of the head in accordance with the present invention and a substrate extending gradually away from the head, as well as an angle α formed by a tangent to a chamfered surface of the back edge at a downstream end of the chamfered surface and by the downstream surface of the back edge at that end.
Figure 2:
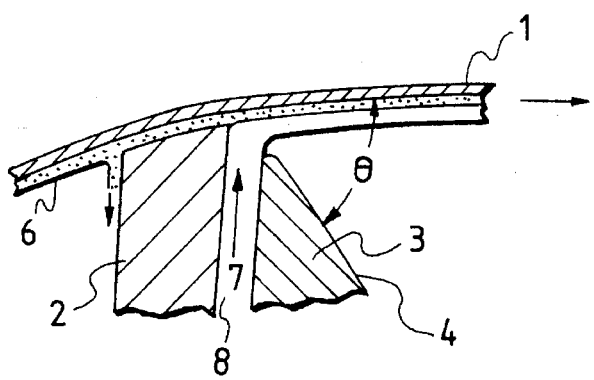
FIG. 2 is a fragmentary side cross-sectional view of one embodiment of the coating head in accordance with the present invention, illustrating the case of a single-layer coating head.
Figure 5:
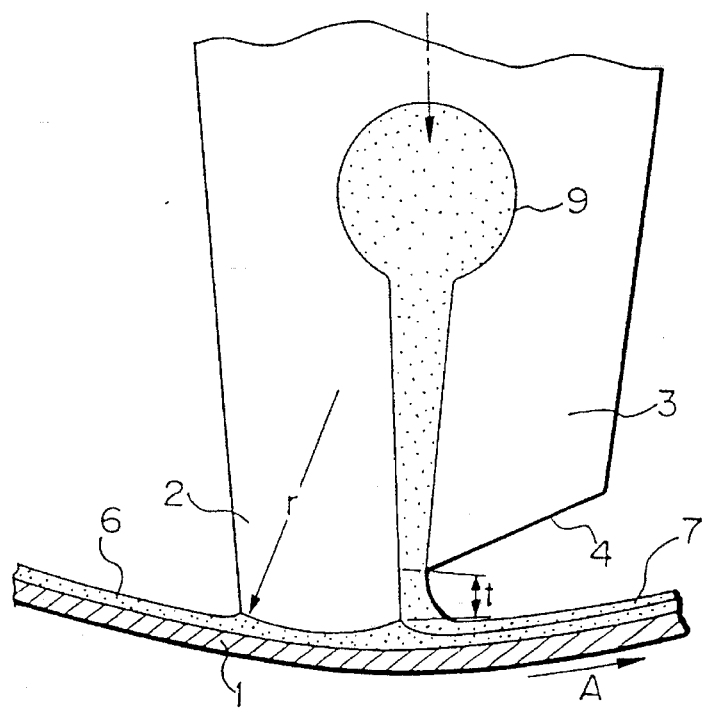
FIG. 5 is a side cross-sectional view of one example of the coating head which is subject to the implementation of the present invention.

The configuration of a coating head and the positional relationship between the coating head and a substrate are shown in FIGS. 1 and 2. FIG. 2 is a schematic diagram of a corner portion of the head, while FIG. 1 is an enlarged view of the corner portion of the head. It should be noted that portions which are not illustrated are designed in the same way as the conventional arrangement shown in FIG. 5.

A front edge 2 is located upstream, as viewed in the moving direction of the substrate, of the outlet of slit 8 for discharging a coating solution 7, and projects closer to the substrate than the corner portion of a back edge 3 disposed on the downstream side. Furthermore, the front edge 2 is formed such that the overall area of the edge surface opposing the substrate 1 swells toward the substrate side. This can be achieved by designing the front edge to have a curved surface. However, the invention is not limited to such a curved surface insofar as the trapping of air can be prevented by other configurations.

The back edge 3 is disposed in such a manner that a corner portion thereof is displaced further from the substrate than a tangent to the front edge 2 at an outlet portion of the slit 8. Furthermore, the back edge 3 is shaped in such a manner that its corner portion which is closest to the substrate at the outlet portion of the slit 8 is chamfered. Hence, the coating solution discharged from the slit 8 is separated at the corner portion from the back edge, so that smoothing is not carried out downstream therefrom.

The slit 8 communicates with a pocket portion 9 (FIG. 5) which serves as a reservoir. The slit 8 may be formed in such a manner that its width gradually decreases from the pocket portion 9 toward the substrate 1, or the width may be constant along the entire length of the slit.

The present invention is designed to prevent the coating solution from overflowing onto a downstream inclined surface 4. This is accomplished by setting an angle (hereafter referred to as an outlet angle) θ formed by the inclined surface 4 of the back edge 3 and the substrate 1 which extends gradually away from the corner of the back edge 3 to not less than 25°, preferably not less than 30°. Specifically, the outlet angle θ can be realized by selecting an appropriate angle of the inclined surface 4 and controlling the positional relationship between the substrate and the head.

Figure 3:
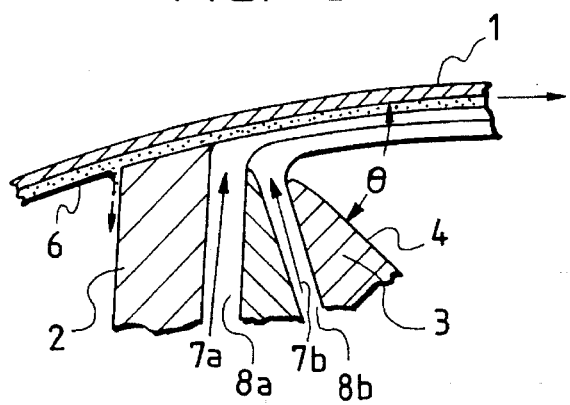
FIG. 3 is a fragmentary side cross-sectional view of another embodiment of the coating head in accordance with the present invention, illustrating the case of a two-layer coating head.

In a case where the head has three or more edges for simultaneously applying two or more layers of coatings, it suffices if the outlet angle θ formed by the downstream inclined surface 4 of the most downstream edge and the substrate 1 is set to not less than 25° and preferably not less than 30°, as shown in FIG. 3.

Referring to FIG. 1, angles α and β corresponding to the degree in which the corner portion of the back edge 3 is chamfered are defined by the following:

$40° \leq \alpha \leq 140°$, and $40° \leq \beta < 180°$.

In this embodiment, although the angle α is defined by $40° \leq \alpha \leq 140°$, it is preferable that α be:

$60° \leq \alpha \leq 120°$, and more preferably, $80° \leq \alpha \leq 100°$.

If the angle α is smaller than the above defined range it is possible that the corner of the back edge 3 may break. However, as long as the angle α is within the aforementioned range, it has been found that the corner of the back edge will not break.

In addition, although the angle β is such that $40° \leq \beta < 180°$, it is preferable that angle β be:

$110° \leq \beta \leq 160°$, and more preferably, $120° \leq \beta \leq 150°$.

In addition, although the width L (mm) of the chamfered surface is such that $0.002 \leq L$, it is preferable that the width L (mm) be:

$0.01 \leq L \leq 0.5$, and more preferably, $0.02 \leq L \leq 0.1$.

If the angle α is small or the width L of chamfer is large, the pressure of the coating solution between the tip of the back edge and the substrate 1 becomes high, with the result that the coating becomes thick. However, if the angle β and the width L of chamfer are within the above ranges, it is possible to prevent the application of a thick coating.

In addition, although the aforementioned angle θ is not less than 25°, it is preferable that the angle be:

$35° \leq \theta \leq 90°$, and more preferably, $40° \leq \theta \leq 70°$.

If the wettability of the downstream inclined surface 4 of the back edge 3 is low, the adhesive strength of the coating solution is low, so that it is possible to prevent the smear.

However, if the angle θ formed by the downstream inclined surface 4 and the substrate 1 is within the above range, it is possible to prevent the smear due to the adhesion of the coating solution irrespective of the wettability of the downstream inclined surface.

If the angle θ formed by the downstream inclined surface 4 of the back edge 3 and the substrate 1 which extends gradually away from the head is not less than 25°, the smearing of the back edge 3 can be prevented without causing the coating solution to be brought into contact with the downstream inclined surface 4 of the back edge 3 during coating, thereby making it possible to prevent the occurrence of streak-like coating defects which are attributable to the smearing of the back edge 3.

However, if the corner of the back edge 3 is a sharp edge, there are cases where the tip of the back edge 3 is partially broken owing to contact with the substrate 1 or the coating solution. Hence, there is a possibility of streak-like coating defects occurring due to the broken portion of the edge. Accordingly, in the present invention, the corner portion of the back edge 3 is chamfered to increase the strength of the corner portion, as described above, so as to positively prevent the occurrence of the streak-like coating defects. Processing is facilitated if this chamfered surface is formed into a flat surface, but a curved surface or multi-stage chamfering may be provided depending on the purpose. In addition, if the width of chamfer is very small, there are cases where the measurement of the angle α after chamfering is difficult, but in this case the aforementioned angle α can be obtained by presetting the angle of a grinding wheel for chamfering.

The angle θ formed by the downstream inclined surface 4 of the back edge 3 and the substrate 1 can be set by adjusting the traveling direction of the substrate 1. Alternatively, if the traveling direction of the substrate 1 is fixed, the angle θ can be set by adjusting the angle of inclination of the downstream inclined surface 4 of the back edge. In that case, the angle θ can be set not only by adjusting the angle of the downstream inclined surface 4 but by adjusting the angle of the corner of the back edge, as described above, or the angle of the aforementioned slit 8, which constitutes a passage for the coating solution, with respect to the substrate 1, i.e., any appropriate measure may be adopted.

As the material of the corner portion of the coating head, it is possible to use a stainless steel, a high speed steel, or the like, but where high-precision finish is required, a cemented carbide or a ceramic is preferable.

As the solution-feeding system, a known technique corresponding to the properties of the coating solution is used. Particularly in the case of a magnetic coating solution, since it generally has a cohesive property, the solution is preferably fed in such a manner as to impart a shearing force to the coating solution to such an extent that the coating solution does not cohere. Specifically, it is possible to use rotors disclosed in Japanese Patent Application No. 63601/1988 and Japanese Patent Application Laid-Open No. 95174/1987. If the rotor disclosed in Japanese Patent Application No. 63601/1988 or the like is not available, it is preferred that the diameter of the pipe between a pump and the coating head be 50 mm or less, that the diameter of the pocket of the magnetic-solution coating head be 2 to 20 mm, that the width of the slit in the magnetic-solution coating head be 0.05 mm to 1 mm, and that the slit length be 5 mm to 150 mm. Nevertheless, the dimensions are not limited to the same.

The coating-solution coating head is disposed between two guide rolls, but a precoating-solution coating head may be disposed between the coating-solution coating head and a guide roll upstream thereof. The lap angle of the substrate with respect to the coating-solution coating head ranges from 2° to 60°, and a span for forming a lap in the coating-solution coating had ranges generally from 50 to 300 mm, but they are not limited to the same.

The coating solution 7 used in the present invention includes photographic light-sensitive coating solutions, magnetic coating solutions, surface-protecting coating solutions, antistatic coating solutions, lubricating coating solutions, and so on. Typical products with these coating solutions coated thereon include various photographic films, printing papers, magnetic recording media, and the like.

In the present invention, a low-viscosity solution constituted mainly by an organic solvent is applied in advance to the coating surface of the substrate 1 by means of a conventional coating apparatus such as a gravure coater, a roll coater, a blade coater, and an extrusion coater. This low-viscosity solution coated in advance prevents the entrained air from being trapped on the upstream side of the front edge when the coating solution is applied, with the result that a satisfactory coating state is maintained. To maintain a more stable coating state, it is desirable to apply an excessive amount of low-viscosity solution as compared with the amount passing through the gap between the substrate and the front edge, and to apply the coating solution while the excessive portion of the low-viscosity solution is being scraped off by the front edge.

The precoating solution 6 which is referred to in the present invention and which is mainly constituted by an organic solvent is a low-viscosity solution. The low-viscosity solution referred to herein is a singly-used organic solvent, such as toluene, methyl ethyl ketone, butyl acetate, and cyclohexane, a solution representing a combination of these solvents, or a solution in which a binder is dissolved in such a solution. Its viscosity is preferably not more than 20 cp and more preferably not more than 5 cp. As the binder, a binder used for the coating solution, which will be described later, is used.

In addition, in magnetic recording media, the coating layer referred to in the present invention includes the case of only one magnetic layer, a case where the magnetic layer is of a multi-layered structure, and a case where a magnetic layer(s) and a nonmagnetic layer are combined and at least one magnetic layer is included. In end products other than the magnetic recording media, conventional layer arrangements are similarly possible.

In cases where a magnetic layer is formed by the coating solution 7 of the magnetic recording medium in accordance with the present invention, a ferromagnetic fine powder is used in the magnetic layer.

As the ferromagnetic fine powder, it is possible to use known ferromagnetic fine powders, such as $\gamma\text{-}Fe_2O_3$, $\gamma\text{-}Fe_2O_3$ containing Co, $Fe_3O_4$, $Fe_3O_4$ containing Co, $\gamma\text{-}Fe_2O_x$, $\gamma\text{-}Fe_2O_x$ (X=1.33–1.50) containing Co, $CrO_2$, Co—Ni—P alloy, Co—Ni—Fe—B alloy, Fe—Ni—Zn alloy, Ni—Co alloy, and Co—Ni—Fe alloy. The grain size of these ferromagnetic fine powders is approximately 0.005 to 1 micron in length, and the axial ratio is approximately 1/1 to 50/1. In addition, the specific surface area of these ferromagnetic fine powders is approximately 1 $m^2/g$ to 70 $m^2/g$.

In addition, as the ferromagnetic fine powder, it is possible to use plate-like hexagonal barium ferrite. The grain size of barium ferrite is approximately 0.001 to 1 micron in diameter, and its thickness is ½ to 1/20 of its diameter. The specific gravity of barium ferrite is 4 to 6 g/cc, and its specific surface is 1 $m^2/g$ to 70 $m^2/g$.

A binder is used for the magnetic layer together with the ferromagnetic fine powder. As the binder used, it is possible to use conventionally known thermoplastic resins, thermosetting resins, reaction-type resins, or a mixture thereof.

As the thermoplastic resin, one having a softening temperature of 150° C. or less, an average molecular weight of 10,000 to 300,000, and a polymeration degree of approximately 50 to 2,000 may be used, such as a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, an acrylic ester-styrene copolymer, a urethane elastomer, a nylon-silicone-based resin, a cellulose nitrate-polyamide resin, polyvinyl fluoride, a vinylidene-acrylonitrile copolymer, a butadiene-acrylonitrile copolymer, a polyamide resin, polyvinyl butyral, cellulose derivatives (cellulose acetate butyrate, cellulose diacetate, cellulose triacetate, cellulose propionate, nitrocellulose, etc.), a styrene-butadiene copolymer, a polyester resin, chlorovinyl ether-acrylic ester copolymer, an amino resin, various synthetic rubber-based thermoplastic resins, and a mixture thereof.

As the thermosetting resin or the reaction-type resin, one which has a molecular weight of 200,000 or more in the state of the coating solution may be used. When heated after the magnetic layer-forming composition is applied and dried, these resins undergo reaction such as condensation, addition, and the like, and their molecular weight can become infinitely large. In addition, among these resins, it is preferred that they do not soften or melt before the resins undergo pyrolysis. Specifically, such resins include phenol resins, epoxy resins, thermosetting polyurethane resins, urea resins, melamine resins, alkyd resins, silicone resins, reaction-type acrylic resins, epoxy polyamide resins, nitrocellulose melamine resins, a mixture of a high molecular weight polyester resin and an isocyanate prepolymer, a mixture of a methacrylic acid-salt copolymer and a diisocyanate prepolymer, a mixture of polyester polyol and polyisocyanate, urea-formaldehyde resins, a mixture of low molecular weight glycol, high molecular weight diol, and triphenyl methane triisocyanate, polyamide resins, and a mixture thereof.

As the ferromagnetic fine powder and the solvent that are dispersed in the binder, and a dispersing agent, a lubricant, an abrasive, and an antistatic agent serving as additives, as well as a nonmagnetic substrate and the like, those that are conventionally used may be used.

As the dispersing agent, it is possible to use the following: fatty acids with a carbon number of 12 to 18 ($R_1COOH$, $R_1$ is an alkyl or alkenyl group with a carbon number of 11 to 17) such as caprylic acid, capric acid, lauric acid, myristic acid, palmitic acid, stearic acid, oleic acid, elaidic acid, linolic acid, linolenic acid, stearolic acid, and the like; metal soap composed of an alkali metal (Li, Na, K, etc.) or an alkaline earth metal (Mg, Ca, Ba) of any of the aforementioned fatty acids; a compound containing fluorine of any of the aforementioned fatty acid esters; an amide of any of the aforementioned fatty acids; polyalkylene oxide alkyl phosphoric ester; lecithin; trialkylpolyolefin hydroxy quaternary ammonium salt (alkyl having a carbon number of 1 to 5, olefin being ethylene, propylene, or the like), and so on. In addition, it is possible to use a higher alcohol having a carbon number of 12 or more, or sulfuric ester or the like.

As the lubricant, although the aforementioned dispersing agents can be recognized to display their effects, it is possible to use the following: silicone oils such as dialkyl polysiloxane (alkyl having a carbon number of 1 to 5), dialkoxy polysiloxane (alkoxy having a carbon number of 1 to 4), monoalkyl monoalkoxy polysiloxane (alkyl having a carbon number of 1 to 5, and alkoxy having a carbon number of 1 to 4), phenyl polysiloxane, and fluoroalkyl polysiloxane (alkyl having a carbon number of 1 to 5), conductive fine powders of graphite or the like; inorganic fine powders of such as molybdenum disulfide and tungsten dioxide; plastic fine powders of polyethylene, polypropylene, a polyethylene-vinyl chloride copolymer, and polytetrafluoroethylene; an $\alpha$-olefin polymer; hydrocarbons of an unsaturated fat group which are liquid at normal temperature ($\alpha$-olefin having a double bond linked to a terminal carbon, and having a carbon number of approximately 20); and fatty esters composed of a monobasic fatty acid having a carbon number of 12 to 20 and a univalent alcohol having a carbon number of 3 to 12, and fluorocarbons.

As the abrasive, it is possible to use the following: fused alumina, silicon carbide, chromium oxide ($Cr_2O_3$), corundum, artificial corundum, diamond, artificial diamond, garnet, emery (main components: corundum and magnetite), and the like.

As the antistatic agent, it is possible to use the following: conductive fine powders such as carbon black and a carbon black graft polymer; natural surface active agents such as saponin; nonionic surface active agents such as those based on alkylene oxide, glycerin, and glycidol; cationic surface active agents such as higher alkylamines, quaternary ammonium salts, pyridine and other heterocyclic compounds, and phosphonium or sulfoniums; anionic surface active agents including an acidic group such as a carboxylic acid group, a sulfonic acid group, a phosphoric acid group, a sulfate group, and a phosphate group; and ampholytic surface active agents such as amino acids, aminosulfonic acids, sulfate of amino alcohol or phosphates.

As the organic solvent used as the coating solvent, it is possible to use solvents based on ketones such as acetone, methyl ethyl ketone, methyl isobutyl ketone, and cyclohexane; solvents based on esters such as methyl acetate, ethyl acetate, butyl acetate, ethyl lactate, and glycol acetate monoethyl ether; solvents based on tar (aromatic hydrocarbons) such as benzene, toluene, and xylene; and chlorinated hydrocarbons such as methylene chloride, ethylene chloride, carbon tetrachloride, chloroform, ethylene chlorohydrin, and dichlorobenzene.

The amount of solvent is two- to three-fold that of the magnetic fine powder. With respect to 100 parts by weight of the binder, 0.5 to 20 parts by weight of the dispersing agent is used; 0.2 to 20 parts by weight of the lubricating agent is used; 0.5 to 20 parts by weight of the abrasive is used; 0.2 to 20 parts by weight of the conductive fine powder used as the antistatic agent is used; and 0.1 to 10 parts by weight of the surface active agent used similarly as the antistatic agent is used.

The magnetic powder as well as the aforementioned bonding agent, dispersing agent, lubricant, abrasive, antistatic agent, solvent, and the like are mixed to form the magnetic paint.

As the material of the substrate on which the magnetic layer is provided, it is possible to use plastic films of polyesters such as polyethylene terephthalate and polyethylene naphthalate, polyolefins such as polypropylene, cellulose derivatives such as cellulose triacetate and cellulose diacetate, vinyl-based resins such as polyvinyl chloride, polycarbonate, polyamide resin, and polysulfone; metallic materials such as aluminum and copper; and ceramics such as glass. These substrates may be provided with pretreatment such as corona discharge treatment, plasma treatment, priming treatment, heat treatment, metal vacuum deposition treatment, and alkaline treatment. The substrates may be provided with desired configurations of various types.

As described above, in accordance with the coating apparatus of the present invention, in the arrangement in which the back edge is displaced from the substrate, the structure adopted is such that the configuration of the corner portion of the back edge is restricted to a particular configuration and its strength is hence increased, and the angle between the substrate and the back edge surface is kept to a fixed range. Accordingly, it is possible to prevent the breakage of the corner portion, and to obviate the smearing of the back edge surface due to the flowing of the coating solution onto the back edge surface. Hence, it is possible to suppress the variation of the coating thickness in the direction of its width and the occurrence of streaks due to the widthwise nonuniformity of the substrate. In particular, in a case where the present invention is applied to the application of a magnetic layer in a magnetic recording medium, a magnetic recording medium having an excellent electromagnetic conversion characteristic can be manufactured at high speed on a stable basis.

The novel effects of the apparatus of the present invention will become more apparent from examples which are described below.

EXAMPLE 1

The various components that are shown in the composition of the coating solution listed below were charged into a ball mill, and after they were sufficiently mixed and dispersed, 30 parts by weight of an epoxy resin (epoxy equivalent: 500) was added thereto and was uniformly mixed and dispersed, thereby obtaining a magnetic coating solution (magnetic dispersant solution).

Figure 4:
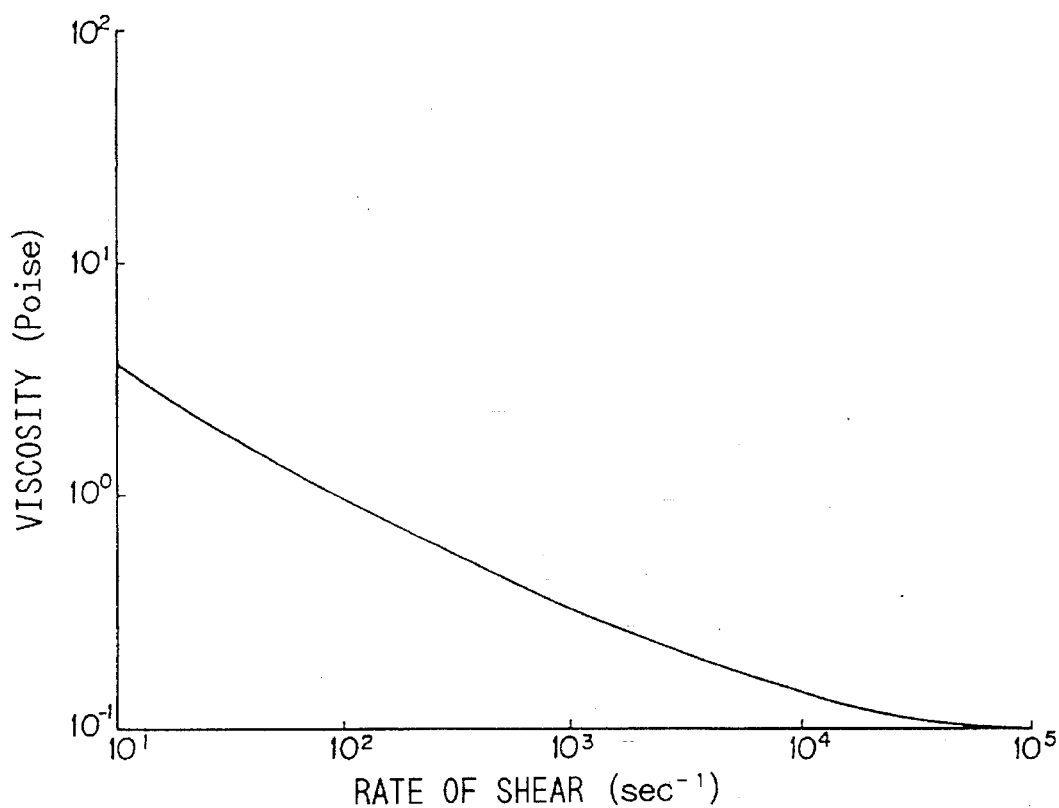
FIG. 4 is a graph of viscosity with respect to a rate of shear in accordance with an embodiment in a case where the present invention is used for a magnetic coating solution.

When the viscosity of the magnetic coating solution thus obtained was measured by a rotoviscometer, the magnetic coating solution displayed a thixotropic viscosity characteristic in which, at each rate of shear, the viscosity declines with an increase in the rate of shear, as shown in FIG. 4.

Composition of coating solution:
- $\gamma$-$Fe_2O_3$ powder (acicular particles with an average grain size of 0.5$\mu$ in the direction of major axis, magnetic field strength: 320 oersteds) . . . 300 wt. parts
- vinyl chloride-vinyl acetate copolymer (copolymerization ratio: 87:13, polymerization degree: 400) . . . 30 wt. parts
- conductive carbon . . . 20 wt. parts
- polyamide resin (amine value: 300) . . . 15 wt. parts
- lecithin . . . 6 wt. parts
- silicone oil (dimethyl polysiloxane) . . . 3 wt. parts
- xyrol . . . 300 wt. parts
- methyl isobutyl ketone . . . 300 wt. parts
- n-butanol . . . 100 wt. parts In addition, methyl isobutyl ketone was used as the precoating solution, which was applied to a thickness of 2.0 $\mu$m (in a wet state) by the bar coating method.

In the state of being liquid-sealed by means of this precoating solution, by using an extrusion-type head having an arrangement as shown in FIG. 1 and by means of a head with a back-edge tip angle $\phi$=50°, coating was effected with a tensile force of 10 kg/entire width and at a coating rate of 600 m/min with respect to a polyethylene terephthalate web with a thickness of 15 $\mu$m and a width of 500 mm serving as the substrate by setting the aforementioned outlet angle $\theta$ to 20°, 25°, and 30° by changing the position of a pass roller.

Furthermore, coating was effected by fixing the angles $\alpha,\beta$ of the chamfered surface and the width L of chamfer. The results are shown in Table 1. It should be noted that, in each table, the coating thickness error is the difference with respect to a set thickness, and the number of streaks is the number per coating area of 10,000 m². As for the evaluation codes, ⊚ represents "very good in practical applications"; o represents "good in practical applications"; Δ represents "usable in practical applications"; and × represents "cannot be used in practical applications."

TABLE 1

| $\theta$ | $\alpha$ | $\beta$ | L | Coat Thickness Error | Number of Streaks | Evaluation |
|---|---|---|---|---|---|---|
| 20° | 110° | 120° | 0.05 mm | 0.34 $\mu$m | 9 | Δ |
| 25° | 110° | 120° | 0.05 mm | 0.12 $\mu$m | 1 | o |
| 30° | 110° | 120° | 0.05 mm | 0.07 $\mu$m | 0 | ⊚ |

As is apparent from the results shown in Table 1, when the outlet angle $\theta$ was not less than 25°, the coating thickness error was 3% or less, and there was only one streak, so that it can be seen that satisfactory coating was effected on the whole. Furthermore, it can be seen that when the outlet angle $\theta$ was not less than 30°, the results were even better

EXAMPLE 2

Coating was effected in the same way as in Example 1 except that in Example 2 the tip angle $\phi$ and the position of the pass roll were changed, the outlet angle $\theta$ was fixed (25°), and the angle $\alpha$ of the chamfered surface was varied. The results are shown in Table 2.

TABLE 2

| $\theta$ | $\alpha$ | $\beta$ | L | Coat Thickness Error | Number of Streaks | Evaluation |
|---|---|---|---|---|---|---|
| 25° | 30° | 120° | 0.05 mm | 0.37 $\mu$m | 14 | x |
| 25° | 40° | 120° | 0.05 mm | 0.12 $\mu$m | 1 | o |
| 25° | 50° | 120° | 0.05 mm | 0.05 $\mu$m | 1 | o |
| 25° | 110° | 120° | 0.05 mm | 0.06 $\mu$m | 0 | ⊚ |
| 25° | 140° | 120° | 0.05 mm | 0.09 $\mu$m | 2 | o |
| 25° | 150° | 120° | 0.05 mm | 0.28 $\mu$m | 11 | x |

As is apparent from the results shown in Table 2, when the angle $\alpha$ of the chamfered surface was in the range from 50° to 140°, the coating thickness error was 3% or less, and there were only two streaks, so that it can be seen that satisfactory coating was effected on the whole.

It should be noted that if the angle $\alpha$ was smaller than 50°, streaks occurred during coating, but this is estimated to be attributable to the fact that new breakage occurred at the head owing to the chamfer. In addition, if the angle $\alpha$ exceeded 140°, no breakage of the head occurred, but streaks were liable to occur during coating. When the edge surface in this state was observed after coating, the smear of the coating solution was found adhering to a downstream inclined surface 4 of a back edge 3, and this is conceivably due to the fact that a downstream meniscus failed to be released from the tip of the back edge, resulting in the occurrence of streaks.

EXAMPLE 3

Coating was effected in the same way as in Example 1 except that in Example 3 the tip angle $\phi$ and the position of the pass roll were changed, the outlet angle θ was fixed (25°), and the angle β was varied. The results are shown in Table 3.

TABLE 3

| θ | α | β | L | Coat Thickness Error | Number of Streaks | Evaluation |
| --- | --- | --- | --- | --- | --- | --- |
| 25° | 110° | 30° | 0.05 mm | 0.44 μm | 14 | x |
| 25° | 110° | 40° | 0.05 mm | 0.16 μm | 2 | o |
| 25° | 110° | 90° | 0.05 mm | 0.12 μm | 0 | ⊙ |
| 25° | 110° | 140° | 0.05 mm | 0.06 μm | 1 | o |
| 25° | 110° | 160° | 0.05 mm | 0.14 μm | 2 | o |
| 25° | 110° | 180° | 0.05 mm | 0.31 μm | 11 | x |

As is apparent from the results shown in Table 3, when the angle β of the chamfered surface was in the range from 110° to 160°, the coating thickness error was 4% or less, and there were only two streaks so that it can be seen that satisfactory coating was effected on the whole.

EXAMPLE 4

Coating was effected in the same way as in Example 1 except that in Example 4 the outlet angle θ was fixed (25°), and the width L of chamfer was varied. The results are shown in Table 4.

TABLE 4

| θ | α | β | L | Coat Thickness Error | Number of Streaks | Evaluation |
| --- | --- | --- | --- | --- | --- | --- |
| 25° | 110° | 120° | 0.001 mm | 0.29 μm | 18 | x |
| 25° | 110° | 120° | 0.002 mm | 0.12 μm | 2 | o |
| 25° | 110° | 120° | 0.01 mm | 0.04 μm | 0 | ⊙ |
| 25° | 110° | 120° | 0.05 mm | 0.04 μm | 0 | ⊙ |
| 25° | 110° | 120° | 0.1 mm | 0.04 μm | 0 | ⊙ |

As is apparent from the results shown in Table 4, when the width L of the chamfered surface was not less than 0.002 mm, the coating thickness error was 3% or less, and there were only two streaks so that it can be seen that satisfactory coating was effected on the whole.

EXAMPLE 5

Coating was effected in the same way as in Example 1 except that in Example 5 the outlet angle θ the angles α,β of the chamfered surface, and the width L of the chamfered surface was varied as shown in Table 5. The results are shown in Table 5.

TABLE 5

| θ | α | β | L | Coat Thickness Error | Number of Streaks | Evaluation |
| --- | --- | --- | --- | --- | --- | --- |
| 30° | 110° | 140° | 0.05 mm | 0.05 μm | 1 | ⊙ |
| 30° | 100° | 130° | 0.05 mm | 0.03 μm | 0 | ⊙ |
| 25° | 90° | 120° | 0.10 mm | 0.09 μm | 0 | ⊙ |
| 25° | 120° | 110° | 0.10 mm | 0.11 μm | 1 | ⊙ |
| 20° | 110° | 140° | 0.05 mm | 0.17 μm | 4 | o |
| 30° | 35° | 140° | 0.05 mm | 0.17 μm | 3 | o |
| 30° | 110° | 25° | 0.05 mm | 0.19 μm | 4 | o |
| 30° | 110° | 140° | 0.0015 mm | 0.21 μm | 4 | o |

As is apparent from the results shown in Table 5, when any one of θ, α, β, and L had a value which deviated from the ranges in accordance with the present invention, the coating thickness error and the number of streaks increased, so that the evaluation declined slightly. Accordingly, it was found that all of θ, α, β, and L should preferably satisfy the ranges discussed above.

We claim:

1. A method for forming one or more coating layers on a substrate using a coating head having at least a first slot for extruding a coating liquid, said coating head including a front edge located on an upstream side of the first slot and a back edge located on a downstream side of the first slot and having a chamfered corner surface, the chamfered corner surface intersecting at one end thereof with a downstream inclined surface of the back edge, and intersecting at another end thereof with an upstream inclined surface partially defining the first slot, said method comprising the steps of:

(1) positioning and maintaining the substrate and the coating head in such a manner that (a) the front edge of the coating head adjoins the substrate, and (b) an angle θ, formed by the downstream inclined surface and by a portion of the substrate that extends in a downstream direction away from the coating head, is never less than 25°;

(2) moving the substrate in the downstream direction relative to the coating head;

(3) extruding the coating liquid through the first slot in the coating head onto the substrate;

(4) displacing the chamfered corner surface closest to the substrate further from the substrate than a tangent to the front edge at an outlet portion of the first slot, so that smoothing of the coating layer is not carried out downstream therefrom.

2. The method recited in claim 1, wherein said angle θ is not less than 30°.

3. The method recited in claim 1, wherein said angle θ is not less than 35° and not greater than 90°.

4. The method recited in claim 1, wherein said angle θ is not less than 40° and not greater than 70°.

5. The method recited in claim 1, wherein:

an angle α, formed by the intersection of said chamfered corner surface with said downstream inclined surface, is not less than 40° and not greater than 140°, and an angle β, formed by the intersection of said chamfered corner surface with said upstream inclined surface, is less than 180° and not less than 40°.

6. The method recited in claim 5, wherein said angle α is not less than 80° and not greater than 100°.

7. The method recited in claim 5, wherein said angle β is not less than 120° and not greater than 150°.

8. The method recited in claim 1, wherein a width L of the chamfered surface is not less than 0.01 mm and not greater than 0.5 mm.

9. The method recited in claim 1, wherein said angle θ is not less than 40° and not greater than 70°.

10. The method recited in claim 9, wherein an angle α, formed by the intersection of said chamfered corner surface with said downstream inclined surface, is not less than 80° and not greater than 100°.

11. The method recited in claim 10, wherein an angle β, formed by the intersection of said chamfered corner surface with said upstream inclined surface, is not less than 120° and not greater than 150°.

12. The method recited in claim 11, wherein a width L of the chamfered surface is not less than 0.02 mm and not greater than 0.1 mm.

\* \* \* \* \*